US006577807B1

(12) United States Patent
Yaegashi et al.

(10) Patent No.: US 6,577,807 B1
(45) Date of Patent: Jun. 10, 2003

(54) EDITING METHOD AND APPARATUS FOR MOVING PICTURES

(75) Inventors: Kazuhito Yaegashi, Kodaira (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/347,408

(22) Filed: Jul. 6, 1999

Related U.S. Application Data

(63) Continuation-in-part of application No. 08/970,202, filed on Nov. 14, 1997, now Pat. No. 6,154,601.

(30) Foreign Application Priority Data

Nov. 15, 1996 (JP) .............................. 8-304944
Nov. 15, 1996 (JP) .............................. 8-304945
Jul. 3, 1998 (JP) ........................... 10-189389

(51) Int. Cl.[7] .............................................. H04N 5/91
(52) U.S. Cl. ...................................................... 386/52
(58) Field of Search ............................. 386/46, 52, 64, 386/65, 98, 125; 707/512, 514; 345/853, 723

(56) References Cited

U.S. PATENT DOCUMENTS

| 5,177,513 A | | 1/1993 | Saito ........................... 352/129 |
| 5,204,706 A | | 4/1993 | Saito ........................... 252/129 |
| 5,388,197 A | | 2/1995 | Rayner ........................ 345/328 |
| 5,404,316 A | | 4/1995 | Klinger et al. .............. 345/328 |
| 5,537,528 A | * | 7/1996 | Takahashi et al. ........... 707/512 |
| 5,541,738 A | | 7/1996 | Mankovitz .................. 358/335 |
| 5,546,191 A | | 8/1996 | Hibi et al. .................... 386/95 |
| 5,732,184 A | | 3/1998 | Chao et al. .................. 386/55 |
| 5,758,180 A | | 5/1998 | Duffy et al. ................. 345/328 |
| 5,760,767 A | | 6/1998 | Shore et al. ................. 345/328 |
| 5,877,781 A | | 3/1999 | Tomizawa et al. ............ 386/52 |
| 5,956,453 A | | 9/1999 | Yaegashi et al. .............. 386/52 |

FOREIGN PATENT DOCUMENTS

| JP | 4207877 | 7/1992 |
| WO | 9631829 | 10/1996 |

OTHER PUBLICATIONS

User Guide, Adobe Premiere Version 4.0, Adobe Systems Incorporated, 1994,
User's Guide, Media Suite Pro Version 1.0, Avid Technology, Inc., 1994.
Journal of Visual Languages and Computing, "Content Oriented Visual Interface using Video Icons Visual Database Systems", by Y. Tonomura, et al., 1990, 1, pp. 183–198.

(List continued on next page.)

Primary Examiner—Huy Nguyen
(74) Attorney, Agent, or Firm—Antonelli, Terry, Stout & Kraus, LLP

(57) ABSTRACT

A moving picture editing method and apparatus that edits a moving picture fed from a video material source by working on editing windows displayed on a display to divide a video material into a plurality of cut images each formed of a plurality of frame images, display the representative frame images of each of said cut images on the screen of the display, select the representative frame images, assemble a hierarchical structure formed of a plurality of frame images, display the hierarchical structure, select one or a plurality of the representative frame images as a scene image, incorporate the frame images representative of the scene image in the hierarchical structure, display a tentative indicator image capable of representing an arbitrary video material on the display, incorporate said tentative indicator image in the hierarchical structure, and thus generate the hierarchical structure.

15 Claims, 13 Drawing Sheets

OTHER PUBLICATIONS

W. Kameyama, et al., "A Proposal of Multimedia Document Architecture and Video Document Architecture" Proceedings of the International Conference on Communications, U.S., NY, IEEE, 1991, pp. 511–515.

Y. Tonomura, "Content Oriented Visual Interface using Video Icons for Visual Database Systems" IEEE Workshop on Visual Languages, Oct. 4–6, 1989, pp. 68–73.

R. Baecker, et al "A Multimedia System for Authoring Motion Pictures", Proceedings of ACM Multimedia, US, NY, Nov. 18, 1996, pp. 31–42.

H. Ueda, et al "Automatic Scene Separation and Tree Structure GUI for Video Editing" Proceeding ACM Multimedia 96, Proc. $4^{th}$ pp. 405–406.

K. Mii, et al "Design and Implementation of a News On–Demand System Integrating Retrieval and Editing of News Contents", Systems and Computers in Japan, vol. 29, No. 10., 1998, pp. 1–13.

* cited by examiner

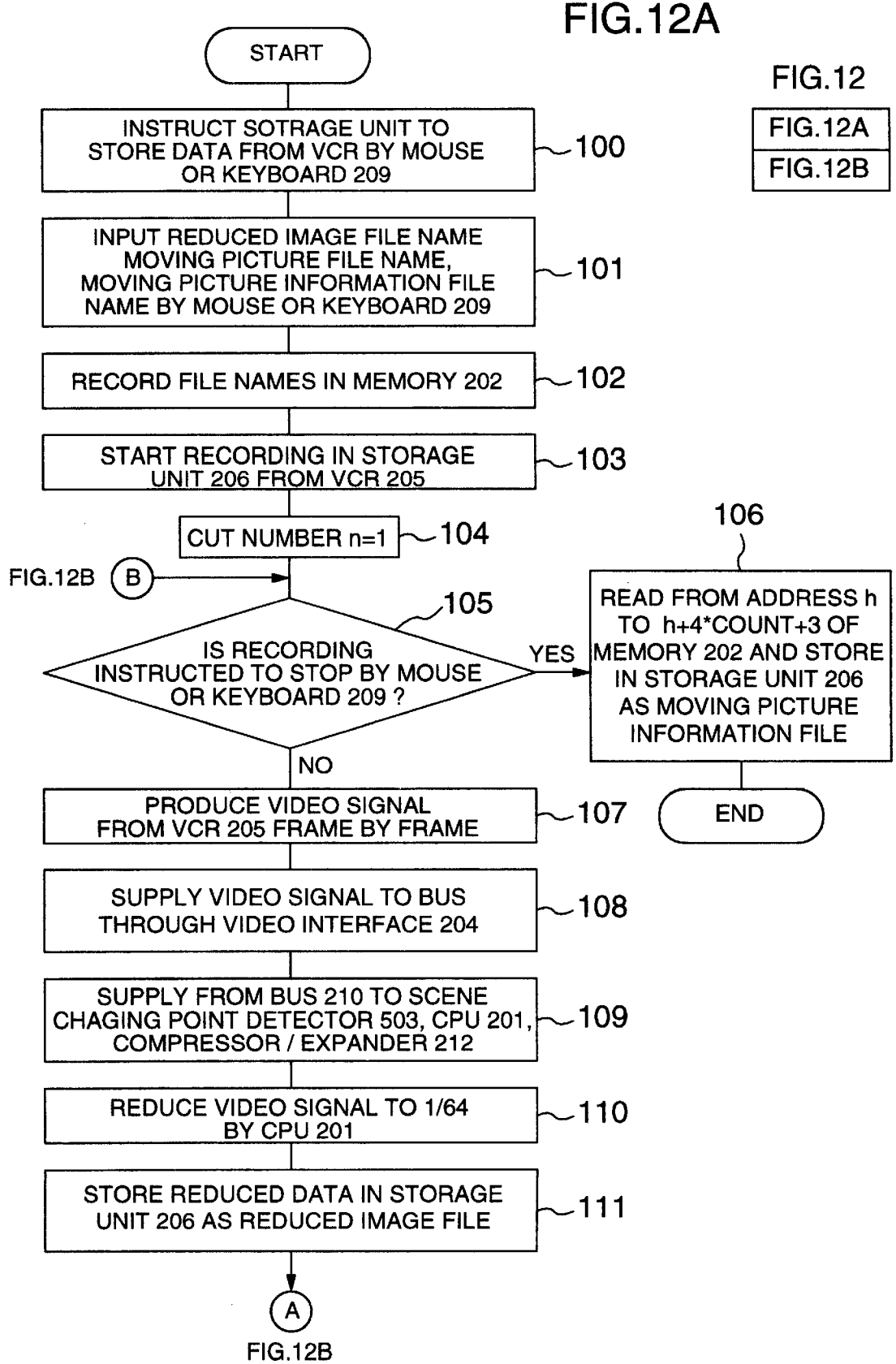

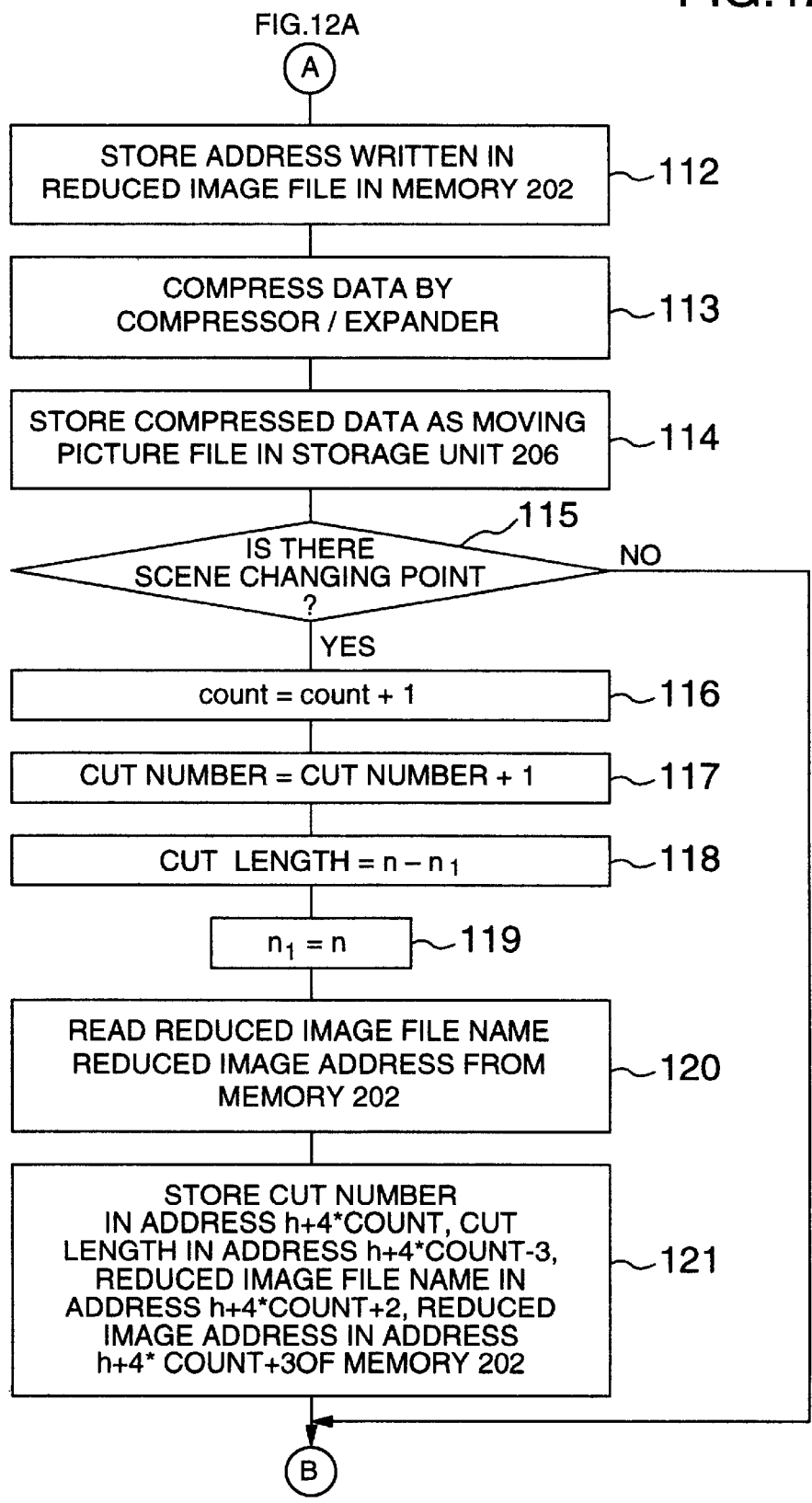

EDITING METHOD AND APPARATUS FOR MOVING PICTURES

CROSS-REFERENCE TO RELATED APPLICATION

The present application is a Continuation-In-Part Application of the application Ser. No. 08/970,202 filed on Nov. 14, 1997 U.S Pat. No. 6,154,601. The disclosures of this application are incorporated therein by reference.

BACKGROUND OF THE INVENTION

The present invention generally relates to moving picture editing methods and apparatus for use in producing moving picture programs such as television broadcast programs and video programs or in other video edition for business or consumers, and particularly to an editing method and apparatus for editing moving pictures by selecting icons of representing image materials that are displayed for editing on windows of a display screen under the control of a computer using necessary program software.

Recently, in cooperation with high-speed, multi-function computers, the computer software has been rapidly developed to be diversified and to have multiple functions. These computers and software products are now used in equipment for producing television broadcast programs and video programs, thus achieving multifunction edition.

Particularly in the recent program production, the edition of image information including image data and audio data makes use of a moving picture editing apparatus having an information storage unit capable of random access, such as hard disks that are easy to handle and store and inexpensive. Furthermore, the multifunctional and diverse computers and software products are employed for that edition.

There is a nonlinear editing system as an example of the moving picture editing apparatus. In this system, video materials are once stored in a disk-type storage unit capable of random access, and representative images of the image materials are read from the storage unit and displayed on the screen of the editing apparatus. The operator operates on the display screen to edit moving pictures. In this editing operation, it is necessary that moving pictures be previously stored and that the representative images and video materials be made to be associated with each other.

When a program is produced, there are a case where a program structure is already determined but video materials are not yet stored in disks, and a case where video materials are already stored in disks but which images are used is not determined. For example, in the production of a regular news program, even if the time and structure of the program are determined, the latest news images may not be gathered until the start of actual program becomes close. In that case, since the program edition cannot be started before the image materials to be used are determined, enough time cannot be consumed for the edition, or only a little time is left for edition. In addition, it is impossible to employ the way that after the construction of program is determined the image materials suitable for that program structure are gathered to produce the program.

SUMMARY OF THE INVENTION

The present invention is to provide a moving picture editing method and apparatus capable of solving the above problems, or producing a tree structure of images for a program even if the moving pictures to be edited are not stored in an information storage unit. Also, in this method and apparatus, even if the image information has been already erased from the storage unit after the end of the moving picture edition, the lost image materials can be again stored in the storage unit and edited without again generating the tree structure.

According to the present invention, there is provided a moving picture editing method and apparatus in which a moving picture fed from a video material source is edited by working on editing windows indicated on a display to divide a video material into a plurality of cut images each formed of a plurality of frame images, display the representative frame images of each of said cut images on the screen of the display, selecting the representative frame images, assembling a hierarchical structure formed of a plurality of frame images, displaying the hierarchical structure, selecting one or a plurality of the representative frame images as a scene image, incorporating the frame images representative of the scene images in the hierarchical structure, displaying a tentative indicator image capable of representing an arbitrary video material, incorporating said tentative indicator image in the hierarchical structure, and thus generating the hierarchical structure.

According to the invention, there is provided a method of displaying images of editing operations of an editing apparatus according to the invention, the method including the steps of displaying a first region for a video material and a second region for a hierarchical structure having a plurality of images of the video material in the first region on the screen of the display, displaying in the first region the frame images representative of a cut image formed of a plurality of frame images, displaying in the second region the hierarchical structure formed of a plurality of the representative frame images, and displaying a tentative indicator image capable of representing an arbitrary video material at a specified position within the hierarchical structure.

According to the invention, there is provided a computer program product that includes a computer readable medium having recorded thereon a computer readable program, when the program is loaded, to make the computer execute the procedure to divide a video material into a plurality of cut images each formed of a plurality of frame images, display the representative frame images of each of the cut images on the screen of the display, select the representative frame images, assemble a hierarchical structure formed of a plurality of frame images, display the hierarchical structure, select one or a plurality of the representative frame images as a scene image, incorporate the frame images representative of the scene image in the hierarchical structure, generate a tentative indicator image capable of representing an arbitrary video material, and incorporate the tentative indicator image in the hierarchical structure, thereby editing a moving picture.

Also, according to the invention, there is provided a computer readable medium having a computer readable program recorded thereon where, when the medium is loaded, the program makes the computer execute the procedure to divide a video material into a plurality of cut images each formed of a plurality of frame images, display the representative frame images of each of the cut images on the screen of the display, select the representative frame images, assemble a hierarchical structure formed of a plurality of frame images, display the hierarchical structure, select one or a plurality of the representative frame images as a scene image, incorporate the frame images representative of the scene image in the hierarchical structure, generate a tentative indicator image capable of representing an arbitrary video material, and incorporate the tentative indicator image in the hierarchical structure, thereby editing a moving picture.

BRIEF DESCRIPTION OF THE DRAWINGS

FIG. 12 consists of FIGS. 12A and 12B, and shows a flowchart of a software program for implementing the embodiment of a moving picture editing method according to the invention.

DESCRIPTION OF THE EMBODIMENTS

Embodiments of a moving picture editing method and apparatus according to the invention will be described with reference to the accompanying drawings. Before the detailed description of the embodiments, the construction of the nonlinear editing system and how to edit will be described to which the invention can be applied.

Figure 2:
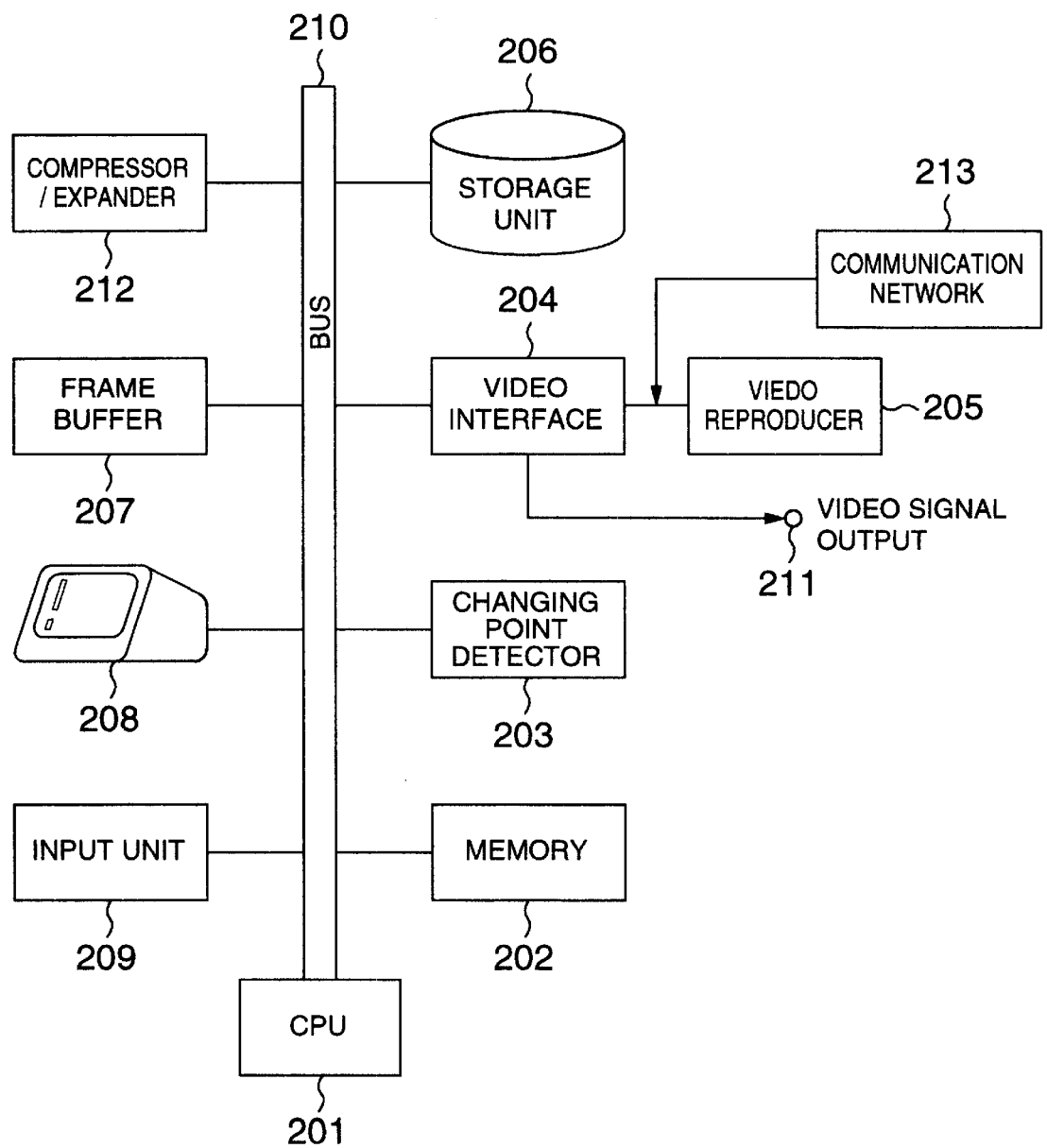
FIG. 2 is a block diagram of an embodiment of a moving picture editing apparatus according to the invention.

FIG. 2 is a block diagram of one example of the construction of a moving picture editing apparatus for executing a moving picture editing method according to the invention.

This moving picture editing apparatus is constructed to include a central processing unit (CPU) 201 for variously controlling each element of the apparatus and making the editing processes according to necessary program software, a display 208 for displaying control information from CPU 201 and information concerning the edition of moving picture, scene image, cut image and the hierarchical structure (tree structure) indicating the situation of the edition, an input unit 209 such as mouse and keyboard for selecting information indicated on the display 208 and supplying commands to CPU 201, a frame buffer memory 207 for storing image information displayed on the display 208, an image reproducer (for example, a video cassette recorder) 205 for reproducing from a recording medium the video signal and audio signal of moving pictures being used for the edition and supplying those signals to the outside, and a video interface 204 for converting the video signal of moving pictures reproduced from the image reproducer 205 into image information of the format to be treated in the moving picture editing apparatus and supplying it to the information storage unit 206 or for converting the video information of moving pictures edited in that format and produced from the information storage unit 206 into the video signal, and supplying it to the outside from a video signal output terminal 211. This apparatus also includes a scene changing point detector 203 for comparing adjacent frame images of the frame images constituting the moving pictures and deciding that when image information as the difference between the frame images changes to exceed a predetermined amount the adjacent images belong to a different cut image, a compressor/expander 212 for compressing or expanding the image information that undergoes format conversion for use in the apparatus and that is produced from the video interface 204, a memory 202 for storing various control program software to be used in the CPU 201, and temporarily storing various control information being used in this editing apparatus, and an information storage unit 206 capable of random access and using, for example, hard disks, and a bus 210 for the digital information transmission among the various units of the moving picture editing apparatus. This information storage unit 206 stores the image information of moving pictures for the edition that are reproduced from the image reproducer 205 and converted into a necessary format by the video interface 204, and stores editing information and control information for use in this apparatus that are temporarily stored in the memory 202, for example, image information files concerning reduced images being displayed. In addition, moving picture data can be supplied to this apparatus from the outside through a communication network 213.

Thus, in this moving picture editing apparatus having the necessary program software stored in memory 202, when the image information of moving pictures being edited can be stored and managed in the information storage unit 206, and the moving pictures stored in the information storage unit 206 can be displayed on the display 208 in the form of icons of cut images and as icons of scene images. The icons of cut images and scene images form a tree structure, and the moving pictures can be edited according to the tree structure.

The icons on the display 208 serves as an interface to the editing information of the cut images and scene images used in the moving picture edition and of the tree structure indicating the editing state. The editing operator uses for example a mouse of the input unit 209 to select this information on the display, thereby being able to instruct the moving picture editing apparatus.

The operation of the apparatus for editing moving pictures will be described below.

First, while viewing the images (not shown) indicated on the display 208, the user instructs the apparatus by, for example, a mouse as the input unit 209 so that the image reproducer 205, for example, a video cassette recorder is operated to reproduce a video signal from a video tape. The reproduced signal is converted by the video interface 204 into image information of a necessary format, which is then stored in the information storage unit 206 through the bus 210.

The converted image information of the necessary format from the video interface 204 is further supplied through the bus 210 to the image changing point detector 203.

The scene changing point detector 203 compares the adjacent frame images of the input image information, and decides that when the image information as the difference between the frame images changes to exceed a predetermine amount the adjacent frame images respectively belong to different cut images.

The cut images decided and separated at the changing point of images are respectively added with cut image numbers under the control of the CPU 201.

The moving picture information formed of the frame numbers of cut images separated at the changing point, cut image numbers of cut images, file names of reduced images and file names of compressed moving pictures are stored in the information storage unit 206.

In addition, the image information converted by the video interface 204 into a necessary format is supplied through the bus 210 to the compressor/expander 212. The compressed moving picture information from the compressor/expander 212 is stored in the information storage unit 206.

Moreover, in order to confirm the whole moving picture formed of a plurality of frame images or the contents of the scene images or the edited program, the reduced images that can be fast read are also registered and stored in the information storage unit 206.

The reduced images which can be fast read from the storage unit 206 are produced by decreasing the pixel number of the image thereby reducing the amount of data and the size of displayed image to match the size of icons displayed as representatives of cut images.

Figure 8:
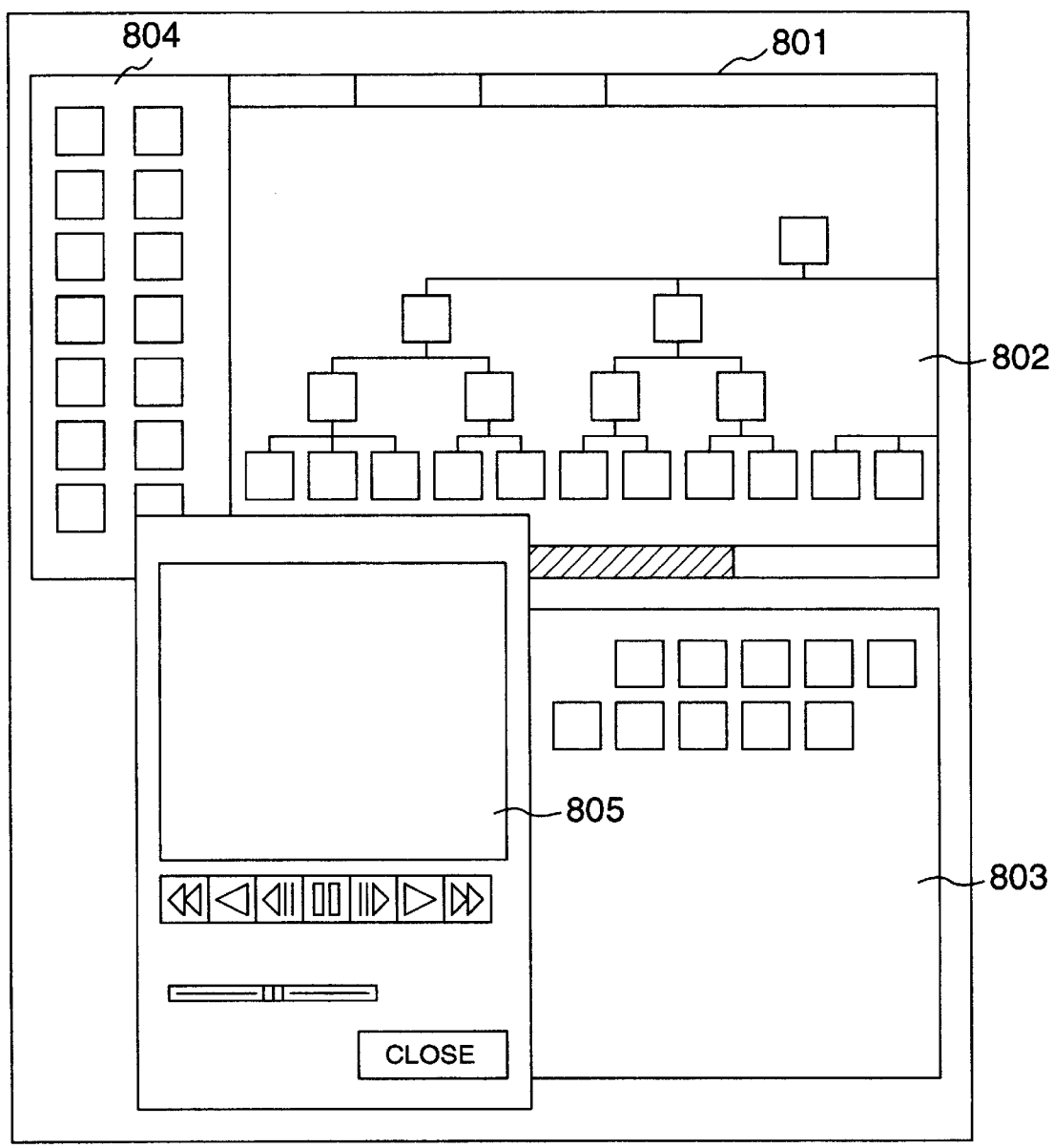
FIG. 8 shows one example of the displayed editing images in the moving picture editing apparatus.

The necessary scene images of the reduced moving picture, when the contents of scene images are desired to confirm, are caused to be displayed by, for example, a mouse of the input unit 209 on a display window 805 as shown in FIG. 8.

FIG. 8 shows the screen of the display 208 displaying an editing window 801, a material area 803, an editing area 802 and an editing function button group 804. A plurality of icons of images representative of cut images are displayed on the material area 803 (although a single image representative of each of cut images is shown for simplicity, a number of frame images of each of cut images are actually displayed in a superimposed manner). The edited tree structure is shown on the editing area 802.

If the changing points between cut images are not correctly detected, the changing points between cut images are indicated as being incorrect, so that the moving picture information in the information storage unit 206 can be reregistered under the control of the CPU 201.

When the operator orders to make editing of a moving picture by for example, the mouse of input unit 209, hierarchical structure management information is read from the storage unit 206 or memory 202 and reregistered.

Figure 11:
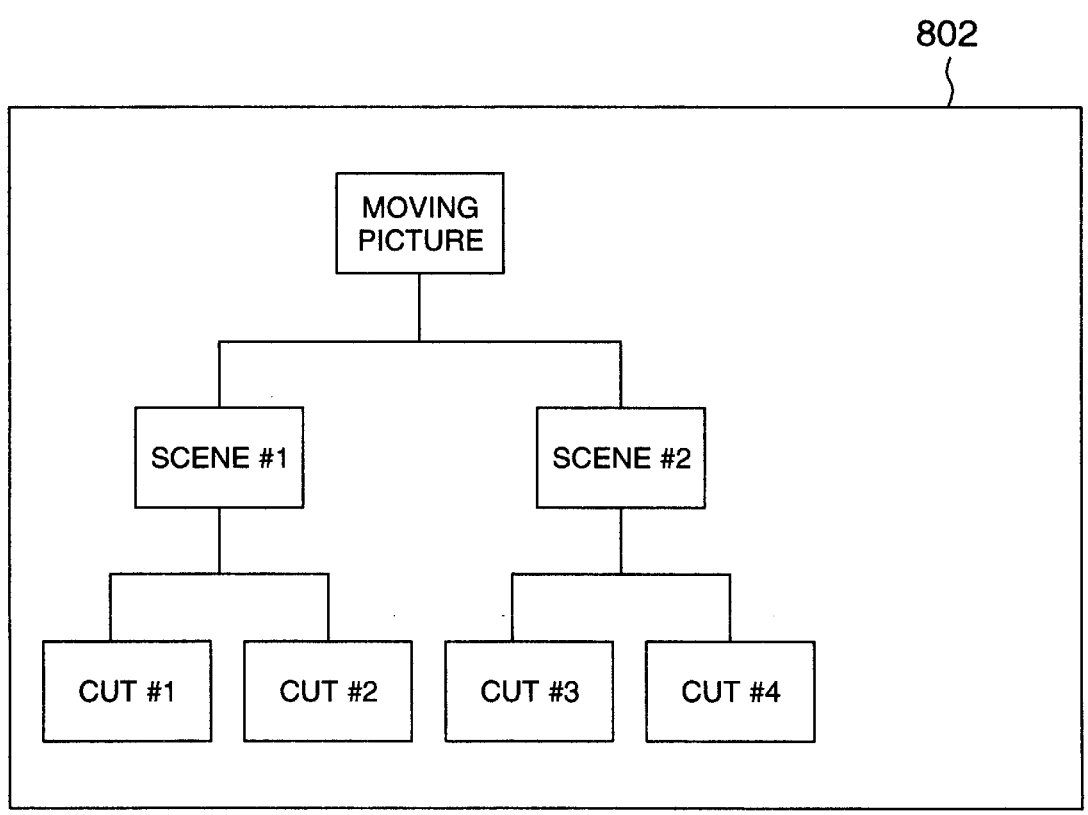
FIG. 11 is a diagram to which reference is made in explaining the displayed editing image of a hierarchical structure according to the moving picture editing method.

A description will be made of the operation in the case where hierarchical structure management information according to the tree structure as for example shown in FIG. 11 is read.

Figure 9:
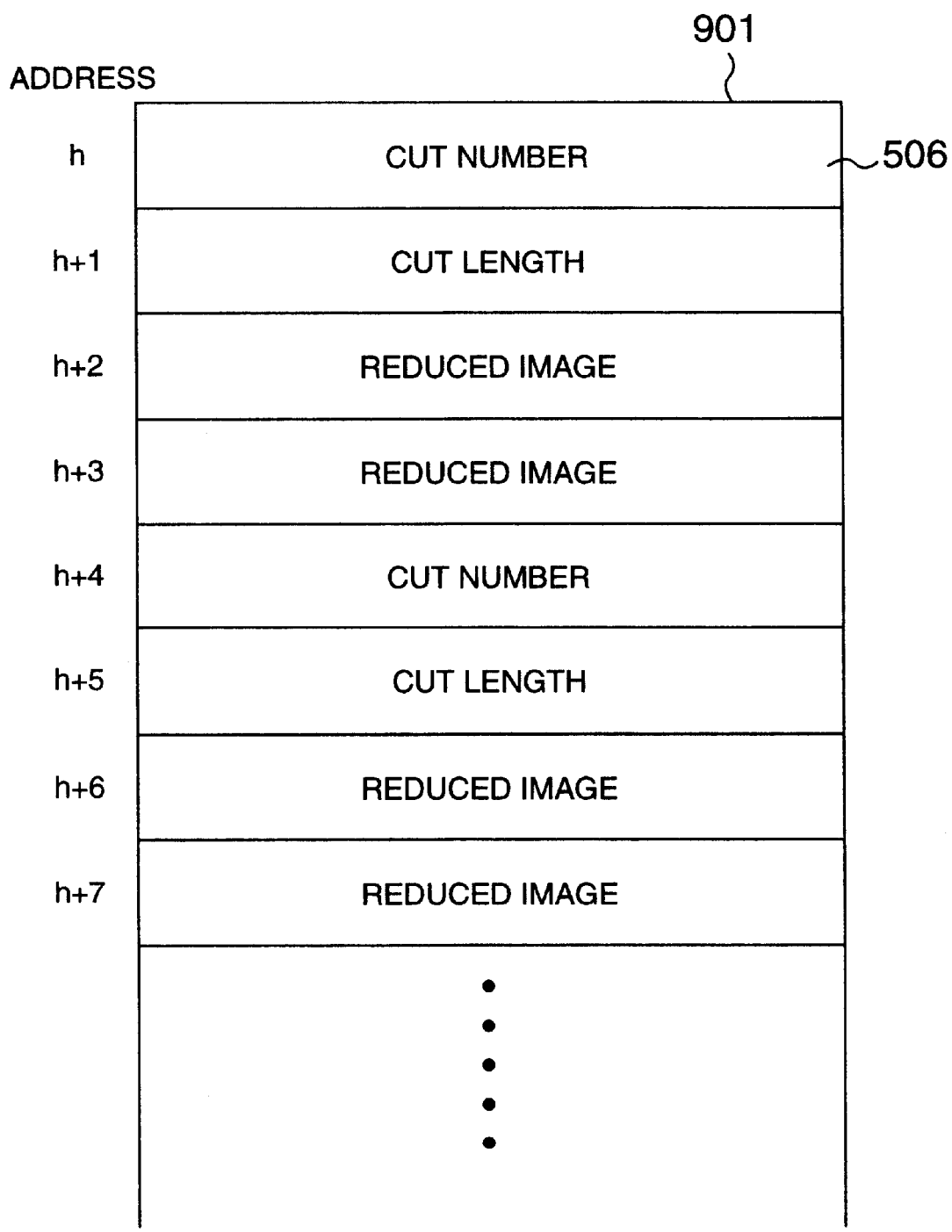
FIG. 9 is a diagram to which reference is made in explaining the structure of one example of a moving picture information file.
Figure 10:
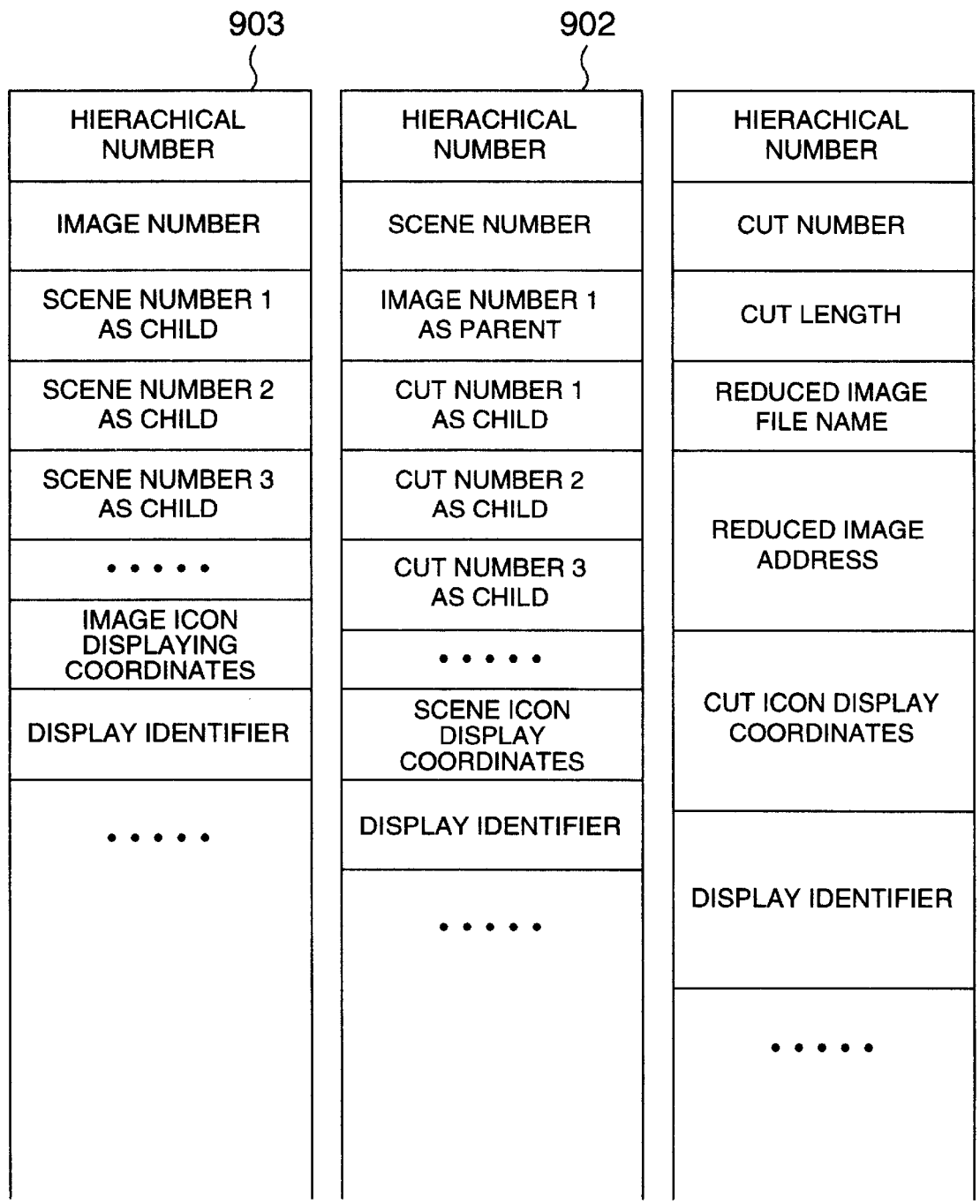
FIG. 10 is a diagram to which reference is made in explaining the structure of other examples of a moving picture information file.

When the cut images #1, #2 of the tree structure (FIG. 11) are ordered to be one scene image #1, the information storage unit 206 is controlled by the CPU 201 to read a moving picture information file 901 of data structure shown in FIG. 9 that correspond to cut images #1, #2 and a hierarchical structure management information file 902 of data structure shown in FIG. 10. The scene image number is set to be a value "1", the addresses of cut image numbers #1, #2 as servants are set to be values "1", "2", and the displaying coordinates at which the icons of the two cut images are displayed are calculated. Then, the calculated values are set in cut image icon displaying coordinates of the hierarchical structure management information file, thus making re-registration. The same operations are performed for the scene image #2, making re-registration into the hierarchical structure management information file. The management files shown in FIGS. 9, 10 and 11 are generated or updated each time a video material is stored in the hard disk 206.

In addition, when the moving picture 1 formed of a plurality of scene images includes scene image #1 and scene image #2 as a one moving picture as shown in FIG. 11, a hierarchical structure management information file 903 shown in FIG. 10 is read from the information storage unit 206, the addresses of scene image numbers #1, #2 as servants are set to be values "1", "2", respectively, and "moving picture #1" is set the number of master image of which the servant scene image numbers have values 1, 2 set as above, thus making re-registration.

Thus, the editing operations are repeated sequentially, so that the CPU 201 makes processing based on the icon-displayed coordinates, causing the tree structure shown in FIG. 11 to be displayed on the editing area 802 (see FIG. 8) of the screen of the display 208.

The editing system for assembling the cut images and generating the hierarchical structure mentioned above is disclosed in the co-pending application Ser. No. 08/970,202. The above-mentioned moving picture editing method and apparatus starts editing under the state in which editing image materials are previously stored in the storage unit. Therefore, it is necessary that the video input information transmitted from a video reproducing unit, or through a satellite channel or an exclusive line of a key station be previously stored in a hard disk in order to generate the tree structure after the recording in the information storage unit. The editing of images is an extremely delicate and important operation, and it takes a longer time than simply storing images in the information storage unit. Thus, if an extremely urgent program such as a news program cannot be previously edited, it will cause an important problem.

In the above-mentioned moving picture editing method and apparatus, the tree structure can not be produced until the moving picture being edited is recorded on, for example, a video tape, reproduced by the video reproducer 205 and stored in the information storage unit 206 as necessary image information. Thus, since the moving picture is edited by necessary editing operations after the generation of the tree structure, the tree structure cannot be produced and the moving picture cannot be edited if the moving picture being edited is not stored in the information storage unit 206.

In addition, let it be considered that the image information stored in the information storage unit 206, for example, the reduced moving picture file is erased. Since there is no longer reduced moving picture file in the moving picture information file, the moving information file cannot be read from the information storage unit 206 even if the operator tries to read the edited moving picture stored in the information storage unit 206 as a moving picture information file, and to change the moving picture edited state.

Moreover, since the capacity of the information storage unit 206 is limited, the moving picture information file decided to be unnecessary is sometimes erased from the information storage unit. When the moving picture information file used for edition was erased by mistake, the edited information is lost and the moving picture must be reedited. When only a file of the files registered in the moving picture information file is lost, it is necessary that the image material be again stored in the storage unit 206 and edited and that the tree structure be newly generated, and thus it takes a great deal of time.

Embodiments of a moving picture editing method and apparatus according to the invention that can solve the above problems will be described below.

FIG. 2 is a block diagram of a moving picture editing apparatus for executing a moving picture editing method according to the invention. The construction shown in FIG. 2 was previously described. The memory 202 stores various control program software for CPU 201 and temporarily stores various edition control information used in the moving picture editing apparatus (a series of moving picture frame numbers, the frame numbers of detected cut image changing points, reduced images (icons) (size of, for example, 80×60 pixels) that are produced from an inputted moving picture (size of, for example, 640×480 pixels) in order to be displayed on the display 208, cut image numbers sequentially attached to cut images, sequential numbers indicating the order of a plurality of cut images and so on).

The information storage unit 206 stores image information of a moving picture for edition reproduced from the image reproducer 205 and converted into a necessary format by the interface 204 and stores various editing control information, for example, image information files of icons that are temporarily stored in the memory 202 and used in the moving picture editing apparatus. This information storage unit 206 uses random-accessible recording media of, for example, hard disks, optical disks or magneto-optical disks.

The elements connected to the bus 210 are controlled by access signals that are sent through the bus 210 from the CPU 201.

The information storage unit 206 may be a remote file connected through the transmission network 213.

Although the necessary control program software are stored in the memory 202, they may be stored in another memory different from the memory 202. For example, they may be stored in a memory that is incorporated in the CPU 201.

In this moving picture editing apparatus, the memory 202 storing the program provided as will be described later, and the information storage unit 206 store and manage the image information of a moving picture being edited. The moving picture stored and managed in the information storage unit 206 is reduced to produce reduced cut images and scene images, and these reduced pictures are displayed as icons on the editing windows of the screen of the display 208. The cut images and scene images are edited, and the edited and registered cut images and scene images are displayed in a tree structure, thus leading to the generation of a program of a sequence of edited moving pictures.

The above-given "cut image" is generally defined as a collection of frame images from the first frame to the last frame in one take shot by a television camera. The cut image is usually a moving picture. In the moving picture editing apparatus of the invention, the icons displayed on the screen of the display 208 serve as a user interface having one-to-one correspondence with cut images.

The "icon" is a reduced image to which a cut image is reduced in its size at a necessary reduction rate, and displayed as a representative of the cut image when all the moving picture comprised of a plurality of frame images, or scene images is fast read and displayed.

The "scene image" is defined as a collection of a plurality of cut images each picked up for a certain object. A plurality of scene images are collected together to form one program for a particular subject.

The moving picture edited as one program can be displayed and arranged on the display as a tree structure of information, that is, of a moving picture of sequential images (program) that is comprised of a plurality of cut images, scene images each being a collection of a plurality of cut images, and subjects each being a collection of a plurality of scene images.

A description will be made of one example of the moving picture edition in a moving picture editing method and apparatus according to the invention.

In order to edit for a moving picture, first the image reproducer 205, for example, a video cassette recorder is operated to reproduce a medium, for example, a video tape having recorded thereon a moving picture that is desired to edit to form a program. The reproduced moving picture (signal) is converted by the video interface 204 into image information of a necessary format, and transmitted through the bus 210 to the information storage unit 206, where the moving picture (information) is stored.

The image information converted into a necessary format by the video interface 204 is also supplied through the bus 210 to the cut image changing point detector 203.

The cut image changing point detector 203 compares the adjacent frame images of the inputted image information, and decides that when the image information of the difference between the frame images changes to exceed a predetermined amount the adjacent frame images respectively belong to different cut images.

The moving picture information comprised of the frame numbers of the cut images detected in the changing points, and the names of fast displaying files and compressed image files is stored in the information storage unit 206.

The moving picture stored in the information storage unit 206 is edited as above. The moving picture stored in the information storage unit 206 includes a necessary number of cut images as image materials for making a program.

Figure 3:
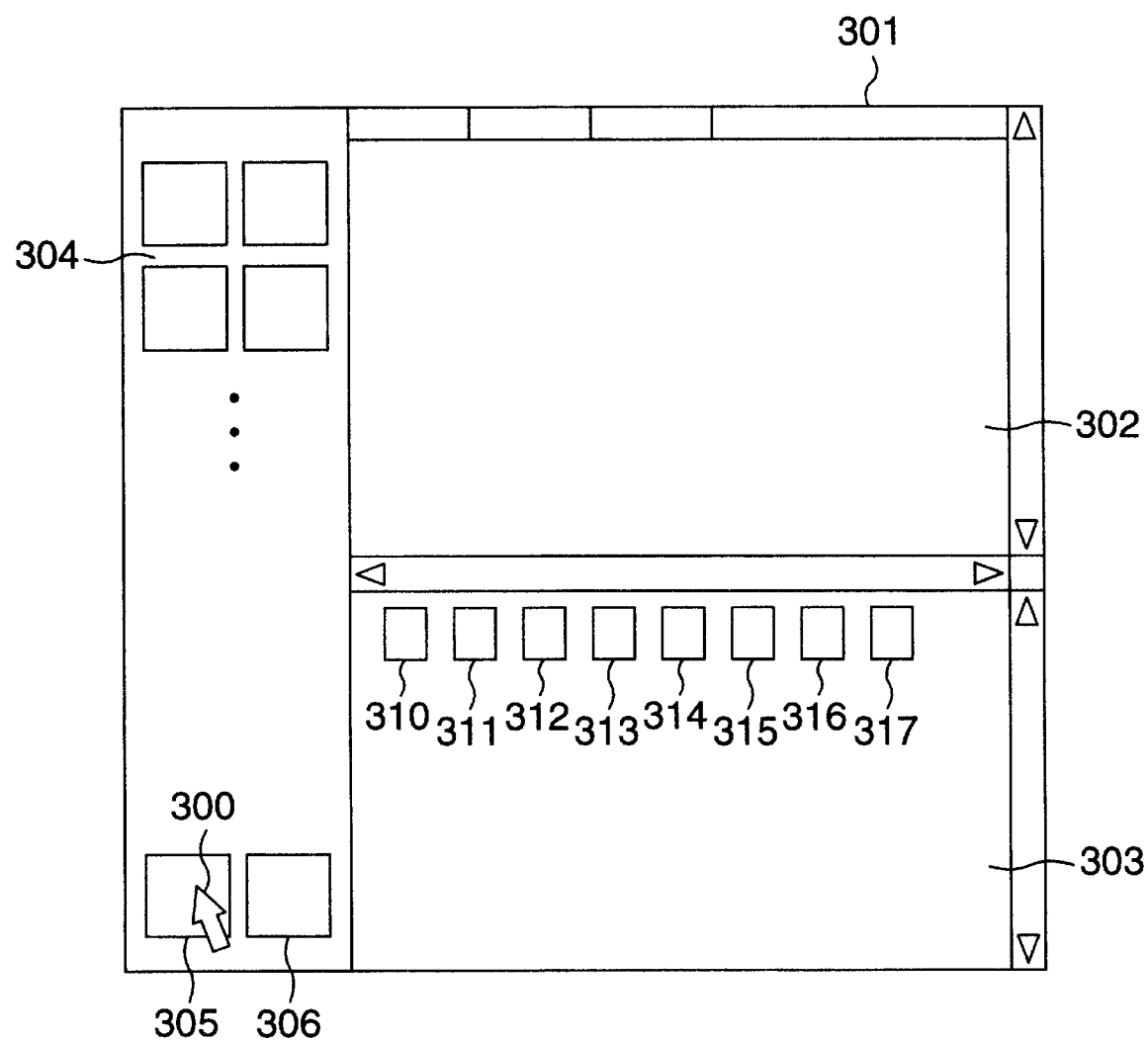
FIG. 3 is a diagram to which reference is made in explaining displayed editing images in the embodiment of a moving picture editing method according to the invention.

FIG. 3 shows one example of the images that are displayed to edit on the display 208 of the moving picture editing apparatus by a moving picture editing method according to the invention. A blank icon generating button switch 305 and a coupling button switch 306 are provided in addition to the editing function button group 804 of the editing window 801 displayed on the screen of the display 208 shown in FIG. 8. Icons 310–317 of cut images are also registered and displayed in a material area 303, but cut images have not been yet displayed edited without a tree structure in an editing area 302.

The editing by use of a moving picture editing method and apparatus according to the invention will be described according to the procedure for editing operations.

The editing operation for a program of which the construction is always constant since it is repeatedly used will be mentioned first. For example, in a news program, a telop of program name is shown for five seconds at the start of the program, the scene of an announcer reading a news manuscript at a broadcasting studio for 20 seconds is shown after the end of the telop, a news picture of 30-second duration is shown after the end of the announcer's reading, and then the announcer's scene and the news scene including audio and text information are repeated three times, and finally a commercial (CM) picture continues for 15 seconds.

In the editing window 301 shown in FIG. 3, a pointer 300 on the screen is moved to match the blank icon generation button switch 305 of the editing function button group 304 by use of, for example, a mouse of the input unit 209 of the apparatus. Then, the blank icon generation button 305 is clicked at the matched position by the mouse.

Figure 4:
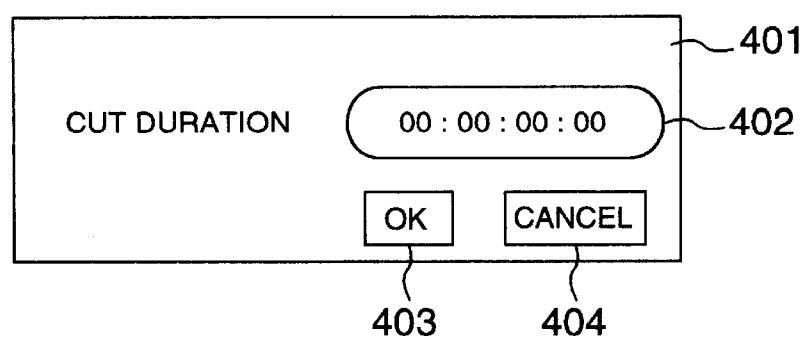
FIG. 4 is a diagram to which reference is made in explaining an editing window used in the embodiment of a moving picture editing method according to the invention.

When the blank icon generation button 305 is turned on, a window 401 for setting the length of cut image is displayed at a predetermined position in the editing window 301 as shown in FIG. 4.

Since the telop of program name first runs for five seconds in a news program, a value corresponding to five seconds is inputted into a cut duration area 402 as "00:00:05:00" by use of a keyboard of the input unit 209.

Then, when an OK button switch 403 is pushed by use of the mouse of the input unit 209 in the same way as described above, "1", "00:00:05:00", "NULL" and another "NULL" are respectively recorded in the addresses of the cut image number, cut image length, fast displaying file name and fast displaying image of the moving picture information file 901 shown in FIG. 9 that is stored in the information storage unit 206. The "NULL" indicates that the corresponding image has not been registered yet or not present.

Thereafter, the cut image length setting window 401 is closed, and an icon 310 is displayed in the material area shown in FIG. 3. This icon is a representative of the cut image having a data length of the value recorded in the moving picture information file 901. The edited images including the blank icons produced in accordance with above-mentioned editing process may be stored as some templates for moving picture edition into a memory, and the template may be read out from the memory to be used for other moving image editions in many times.

Since NULL is recorded in the address of the fast displaying image of the moving picture information file 901, the icon 310 as a representative of the cut image is a blank icon that is displayed as a tentative indicator image for indicating that there is no corresponding cut image. An arbitrary cut image can be coupled to this blank cut image later. Further, a reduced picture of frame image having a constant signal level such as a black video signal may be used in place of the blank icon in the tree structure.

Other programs can also be produced by repeating the same operations. As a result, blank icons 311~317 are displayed in the material area 303 as representatives of the cut images of other programs as shown in FIG. 3.

When a CANCEL button 404 in the cut image length setting window 401 is pushed on, the cut length setting window. 401 is closed without any recording in the moving picture information file 901.

Figure 5:
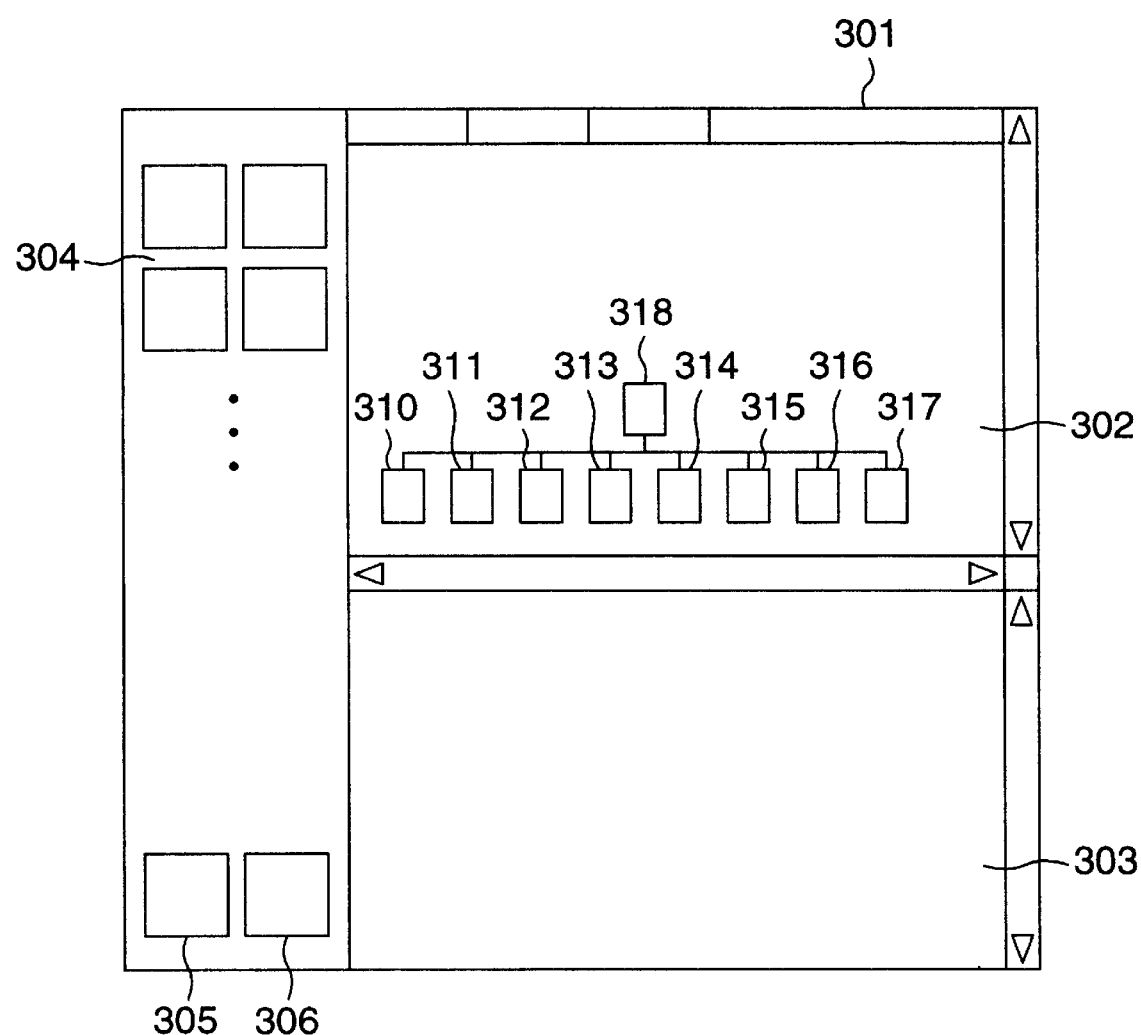
FIG. 5 is a diagram to which reference is made in explaining displayed editing images in the embodiment of a moving picture editing method according to the invention.

Then, the blank icons 310~317 of cut images in the material area 303 are selected, and registered into the editing area 302. As a result, a tree structure can be obtained that is comprised of cut image icons 310~317, and a scene image icon 318 as shown in the editing area 302 in FIG. 5. This tree structure is generated in the same way as described with reference to FIGS. 8 to 11.

Pictures to be used for a news program are selected from the image material and registered in the cut image blanks, producing a news program as described below.

The news images are reproduced from, for example, a video tape having collected images recorded thereon by the video reproducer 205, or supplied through a satellite communication receiving channel or an exclusive line between broadcasting stations, converted into a necessary format, and stored in the information storage unit 206.

Figure 6:
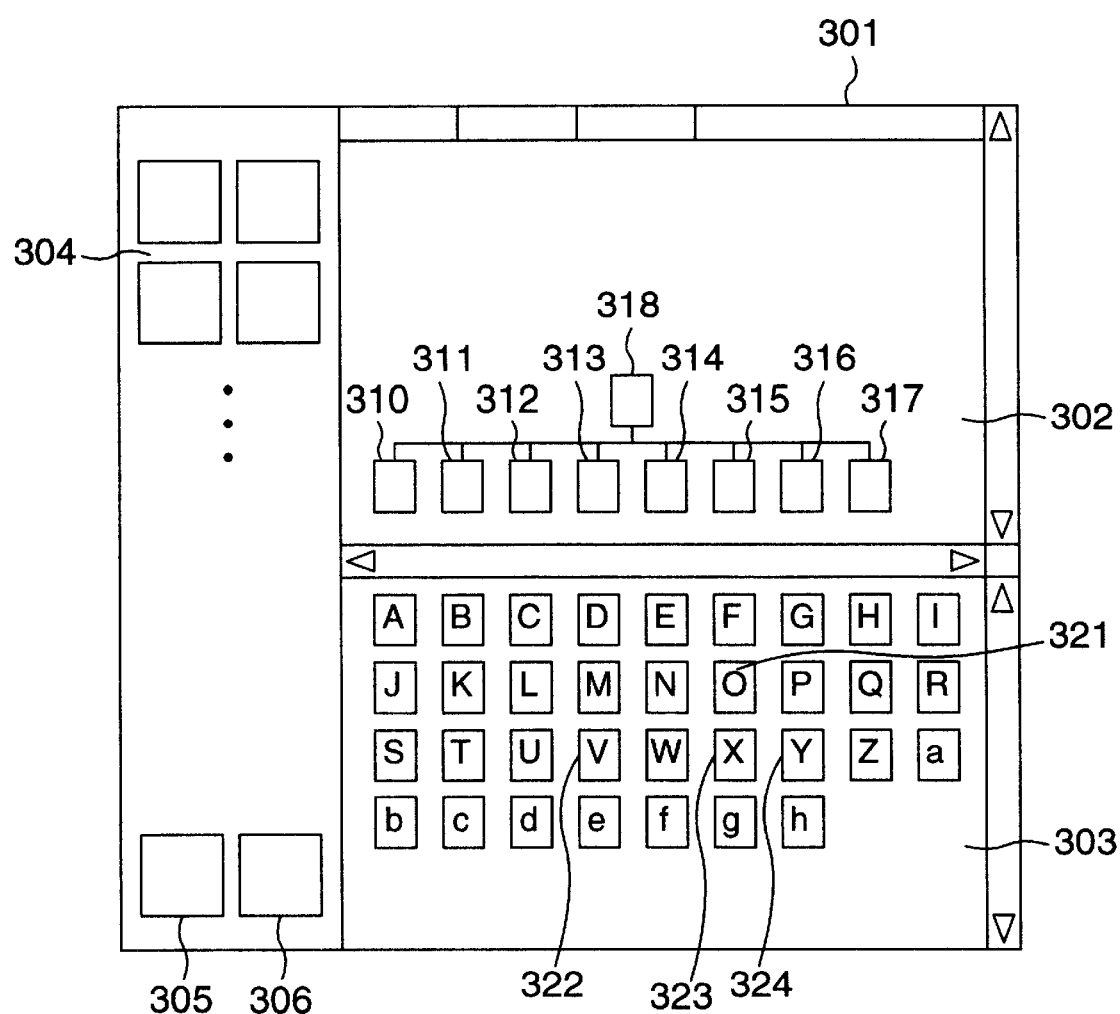
FIG. 6 is a diagram to which reference is made in explaining displayed editing images in the embodiment of a moving picture editing method according to the invention.
Figure 7:
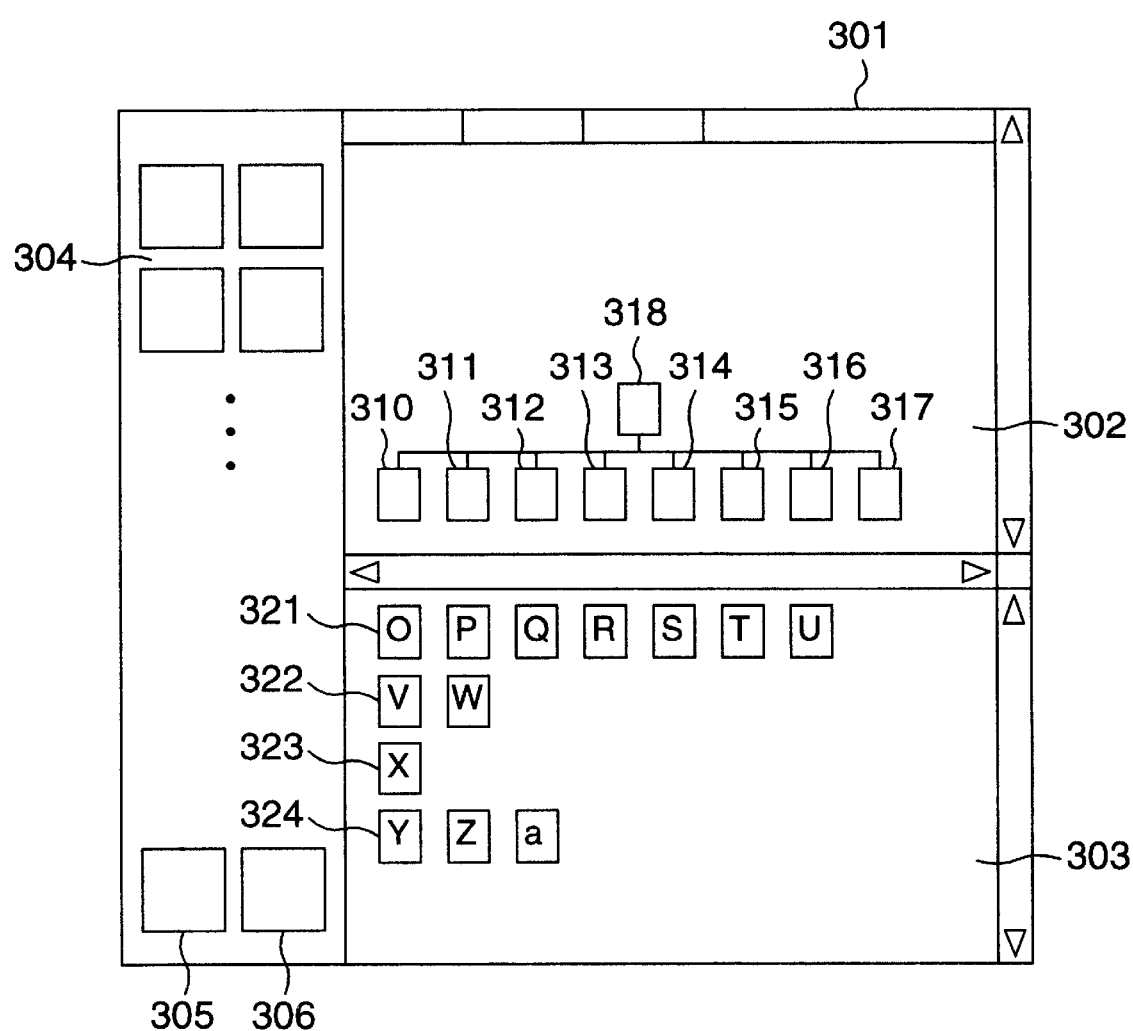
FIG. 7 is a diagram to which reference is made in explaining displayed editing images in the embodiment of a moving picture editing method according to the invention.

When the news images stored in the storage unit 206 are read by use of, for example, a mouse of the input unit 209 (although the images are read by the operation on the windows displayed on the display 208 in the same way as described previously, the detailed description will not be omitted), the cut image changing point detector 203 detects and decides so that the images representative of the cut images separated at each changing point of the cut images are displayed as icons in the material area 303 as shown in FIG. 6 or 7. FIG. 6 shows icons of cut images orderly separated at each changing point of the cut images by the cut image changing point detector 203. FIG. 7 shows icons of cut images after rearrangement of those icons shown in FIG. 6. The image data of these icons are temporarily stored in the memory 202.

The detailed operations of detecting changing points of images, dividing by cutting, assembling the representative images of the cut images and generating a hierarchical structure are described in the co-pending U.S. patent application Ser. No. 09/140,351 filed on Aug. 26, 1998 and titled "Method and Apparatus for Editing Moving Picture Image and Recording Medium for Storing Editing Program." The disclosures of this co-pending application are incorporated herein by reference.

The cut images of a plurality of icons of news images displayed in the material area 303 are coupled to the previously provided blank icons 310~317 displayed in a tree structure in the editing area 302 as described below. A blank icon of a necessary cut image, for example, the blank icon 311 is connected to a cut image of necessary news images, for example, to the icon 322 by use of the mouse of the input unit 209. That is, by moving the pointer to those icons to match, clicking the mouse button to instruct the connection, and then pushing on the couple button switch 306 of the edition function switch group 304 by the mouse of the input unit 209, the cut image is connected to the blank, so that the icon 322 of news images in the material area 303 is displayed as icons 311 in the editing area 302 as shown in FIG. 1.

At this time the icon 322 of news images disappears from the material area 303 since the cut image has been coupled, or the file has moved to other area. Thus it can be perceived that the coupling has been made.

Similarly, the cut image icon 321 of news images is coupled to the blank icon 313 of cut image in the editing area 302, and the cut image icon 323 of news images to the blank icon 315 of cut image, so that the cut image icons 321 and 323 disappear from the material area 303.

Figure 1:
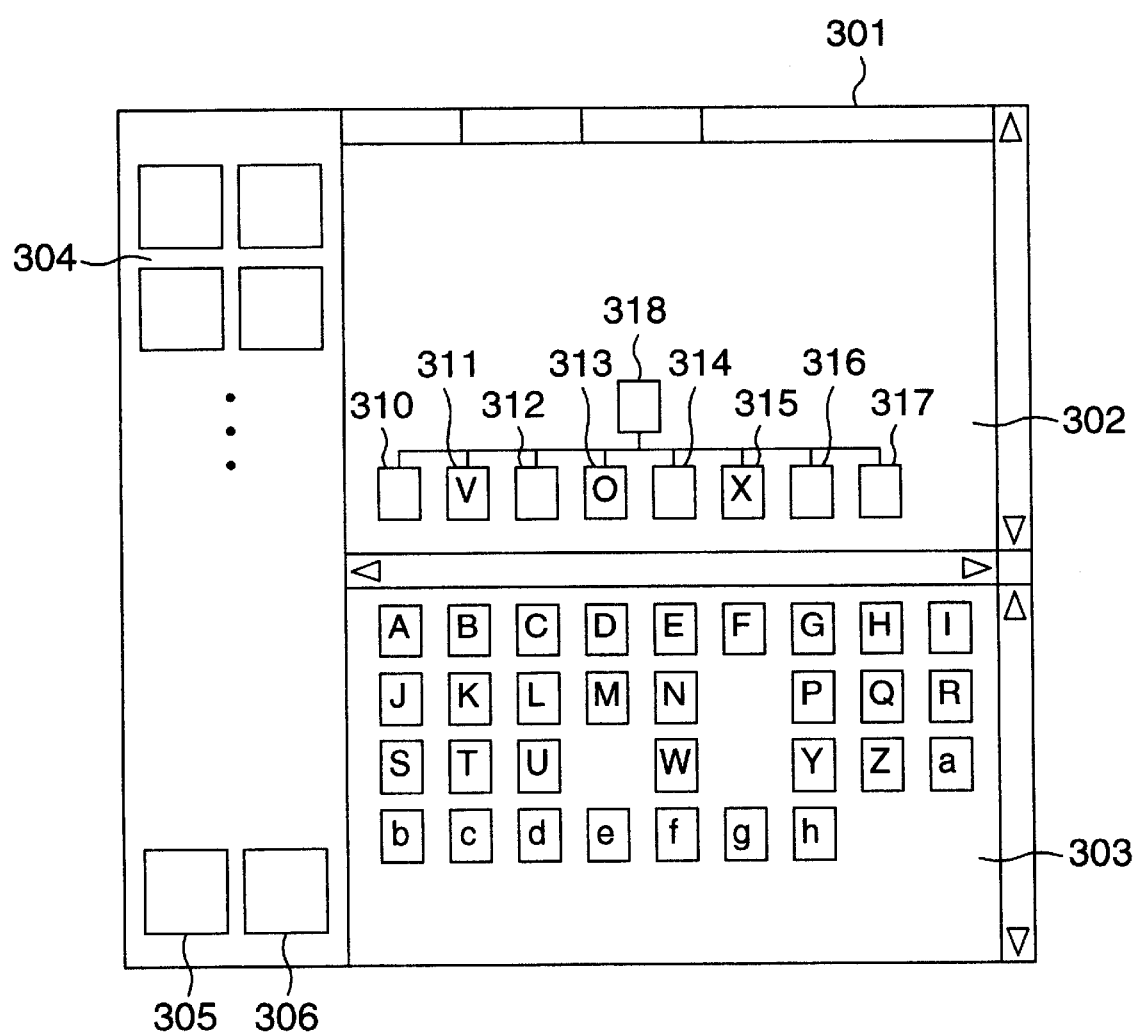
FIG. 1 is a diagram to which reference is made in explaining displayed editing images in an embodiment of a moving picture editing method according to the invention.

Although the news image icon 322 of "V" in the material area 303, for instance, is connected to the blank icon 311, and disappears from the original place by the "movement" as described in the embodiment of FIG. 1, it may be still left in the original area by "copy" after the coupling.

If even one of the files registered in the moving picture information file 901 (see FIG. 9) of the storage unit 206 has been erased from the storage unit 206 and now does not exist, the image material will be required to be again stored in the storage unit 206, thus generating the tree structure in order for the erased file to be reregistered. The operation for avoiding this problem will be described below.

The moving picture and file group of icons stored in the storage unit 206 are displayed as a list on the display 208 by use of, for example, the mouse of the input unit 209.

When a file is erased from the storage unit 206 by the mouse of the input unit 209, the moving picture information file and hierarchical structure management information file in which the file name for instructing to erase is stored are searched for, and "NULL" is written in the fast displaying file name and fast displaying image address of those files.

Since "NULL" is written in the fast displaying image address of the moving picture information file so that blank icons are displayed, the images inserted in hose blanks are required to change, but at this moment when there are no image materials there is no need to again generate the tree structure and edit.

One example of the program in the moving picture editing apparatus of the embodiment according to the invention will be described with reference to the flowchart of FIG. 12. First, at step 100, the operator inputs an instruction into the system of FIG. 2 through the input unit 209, so that the video material data for editing can be reproduced by the reproducer (VCR) 205 and stored in the magnetic storage unit 206. At step 101, the operator inputs the reduced image file name, moving picture file name and moving picture information file name into the system of FIG. 2 through the input unit 209. At step 102, each file name inputted at step 101 is recorded in the memory 202. At step 103, the video material is started to be recorded in the storage unit 206 from the reproducer 205. At step 104, setting of n=1 is made. At step 105, it is decided if an instruction has been issued through the input unit 209 to stop the storage unit 206 from storing the video material from the reproducer 205. If that instruction has been issued to stop the recording (YES), the program goes to step 106, where data of address h to address h+4*count+3 are read from the memory 202, and stored in the storage unit 206 as the moving picture information file (FIG. 9), and the program ends.

If no instruction to stop the recording is issued at step 105 (NO), the program goes to step 107, where the video signal is reproduced frame by frame from the reproducer 205. At step 108, the video signal of one frame is supplied through the video interface 204 to the bus 210. At step 109, the one-frame video signal is supplied from the bus 210 to the scene changing point detector 203, CPU 201 and compressor/expander 212. At step 110, the CPU 201 generates a reduced image of 1/64 the original data amount by thinning out the one-frame video signal. At step 111, the reduced image is stored as a reduced image file in the magnetic storage unit 206. At step 112, the address of the reduced display file of the reduced image is stored in the memory 202. At step 113, the compressor/expander 212 makes data compression processing such as MPEG on the one-frame video signal. At step 114, the compressed video signal is stored as a moving picture,file in the magnetic storage unit 206. At step 115, decision is made of if the one-frame image now being read is a changing point of scene. If it is a changing point of scene (YES), the program goes to step 116, the count is incremented as count=count+1. The data "COUNT" is a number of counts utilized for writing a data into a predetermined address of the moving picture information file 901 (FIG. 9) in step 122. When it is a changing point of scene, a new cut number is required, and thus at step 117 the current cut number is incremented by 1. At step 118, the cut length is set for n-$n_1$. The parameter $n_1$ indicates the previous cut point. At step 119, a process of $n_1$=n is made. At step 120, the reduced image file name and reduced image address are read from the memory 202. At step 121, the new cut number, the cut length, the reduced image file name and the reduced image are stored at the addresses of h+4*count, h+4*count+1, h+4*count+2 and h+4*count+3, respectively. At step 122, a process of n=n+1 is made, and then the program goes back to step 105, where the above operations are repeated for the next one-frame video signal.

A supplementary explanation will be made of the procedure for generating the hierarchical structure management information file shown in FIG. 10. This management information file is generated when the hierarchical structure is produced by editing.

Figure 13A:
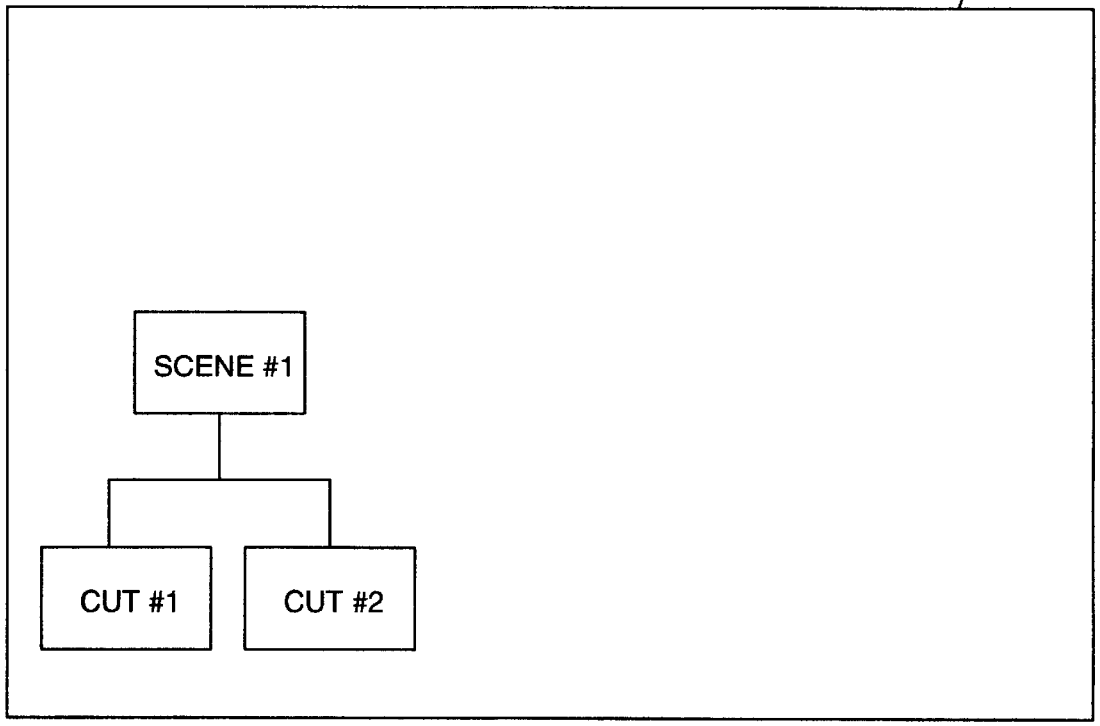
FIGS. 13A and 13B are diagrams for explaining the generation of the hierarchical structure.
Figure 13B:
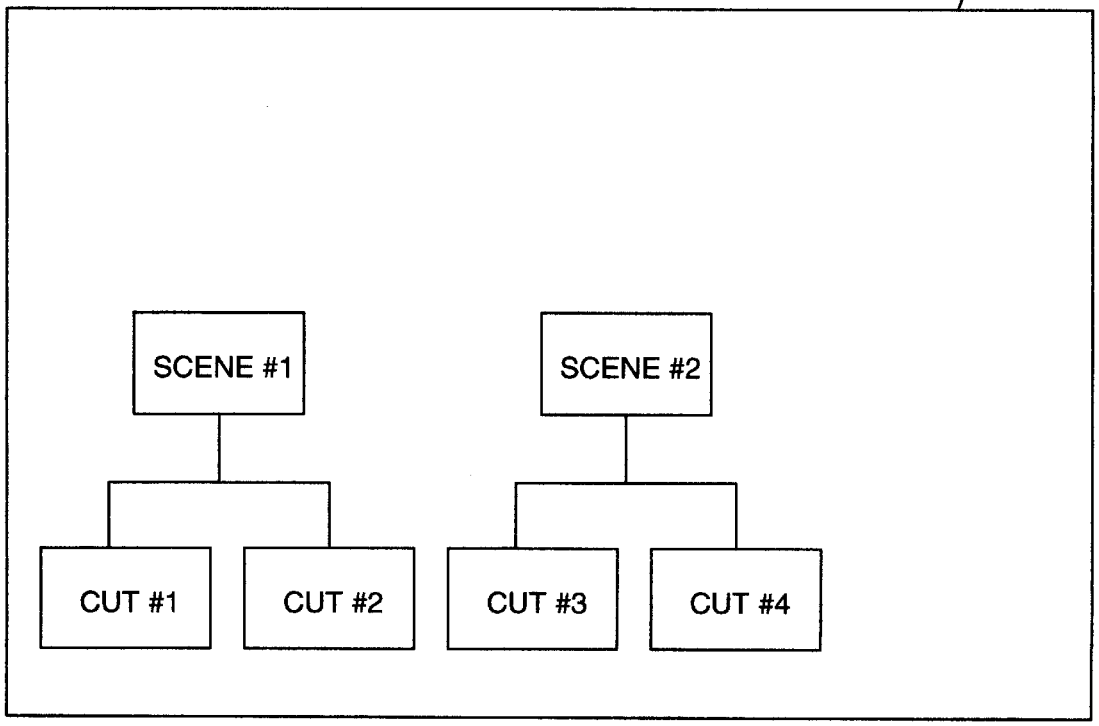

When, for example, cuts #1 and #2 are combined into a scene, and ordered to be scene #1, data corresponding to the cuts #1, 2 are read as the moving picture information file of the construction shown in FIG. 9 from the magnetic storage unit 206. Value "1" is attached to the scene number, and values "1", "2" to the cut numbers #1, #2. In addition, the display coordinates of the scene #1 are calculated from those of the two cuts and registered as the hierarchical structure management information file shown in FIG. 10 in the magnetic storage unit 206. The result is as shown in FIG. 13A. The scene #2 is also processed in the same way, and registered by adding to the hierarchical structure management information file. The result is as shown in FIG. 13B. In addition, as to a moving picture formed of a plurality of scenes, if a moving picture is formed of scene #1 and scene #2, the hierarchical structure management information file is read from the magnetic storage unit 206, values "1", "2" are attached to scene numbers #1, #2 as children, and a value "moving picture #1" is attached to the parent scene number with value "1" recorded. The result is the hierarchical structure shown in FIG. 11.

In this invention, the cut image blanks for the tentative indicator image indicating that there are no particular corresponding cut images may be replaced by other icons, symbols, letters, figures or any combination of them.

According to the invention, even if the moving picture to be edited is not stored in the information storage unit, a tree structure can be generated. In addition, since image edition can be made even if there are no video materials, an urgent news program can be scheduled to broadcast by finishing the edition beforehand by the time when urgent video materials arrive. Thus the program edition can be performed more flexibly.

In addition, the present invention can provide a moving picture editing method and apparatus in which even if the image information stored in the storage unit at the time of editing a moving picture is already erased, the moving picture can be edited after again storing the editing picture materials in the storage unit, without the editing operations for generating the tree structure.

What is claimed is:

1. A moving picture editing method for editing a moving picture from a video material source, comprising the steps of:

generating tentative indicator images intended to correspond to representative images of a plurality of cut images;

forming a hierarchical structure constructed by said tentative indicator images based on a program to be edited, said program being constructed by said cut images;

dividing said moving picture into said cut images, each cut image includes a plurality of frame images;

displaying respective representative frame images representative of said cut images on a display;

selecting said representative frame images to couple said representative frame images of said program with said tentative indicator images in said hierarchical structure; and displaying said selected representative frame images in said hierarchical structure.

2. A moving picture editing method according to claim 1, wherein each tentative indicator image is a blank frame image.

3. A moving picture editing method according to claim 1, wherein each tentative indicator image is at least one of an icon, a symbol, a letter and a figure relating to a cut image.

4. A moving picture editing method according to claim 1, wherein said program is a news program.

5. A moving picture editing method according to claim 1, wherein said cut images are supplied through one of a communication channel and a video recorder.

6. A moving picture editing apparatus for editing a moving picture from a video material source comprising:

- a divider for detecting changing points and dividing said moving picture into a plurality of cut images, each cut image includes a plurality of frame images;
- a first generator for generating tentative indicator images intended to correspond to representative images of said cut images;
- a second generator for generating a hierarchical structure constructed by said tentative indicator images based on a program to be edited, said program being constructed by said cut images;
- a display for displaying respective representative frame images representative of said cut images on a display;
- a selector for selecting said representative frame images to couple said representative frame images of said program with said tentative indicator images in said hierarchical structure; and
- coupling means for coupling said selected representative frame images in said hierarchical structure.

7. A moving picture editing apparatus according to claim 6, wherein each tentative indicator image is a blank frame image.

8. A moving picture editing apparatus according to claim 6, wherein each tentative indicator image is at least one of an icon, a symbol, a letter, and a figure relating to a cut image.

9. A moving picture editing apparatus according to claim 6, wherein said cut images are supplied through one of a communication channel and a video recorder.

10. A moving picture editing apparatus according to claim 6, wherein said video material source is a random access memory.

11. A moving picture editing method for editing a moving picture from a video material source, comprising the steps of:

- dividing said moving picture into a plurality of cut images, each cut image includes a plurality of frame images;
- generating tentative indicator images intended to correspond to representative images of said cut images, and displaying said tentative indicator images in a first region of a display;
- forming a hierarchical structure constructed by said tentative indicator images based on a program to be edited, said program being constructed by said cut images, and displaying said hierarchical structure in a second region of said display;
- displaying respective representative frame images representative of said cut images on said first region of said display;
- selecting said representative frame images to couple said representative frame images of said program with said tentative indicator images in said hierarchical structure; and
- displaying said selected representative frame images in said hierarchical structure in said second region of said display.

12. A moving picture editing method according to claim 11, wherein each tentative indicator image is a blank frame image.

13. A moving picture editing method according to claim 11, wherein each tentative indicator image is at least one of an icon, a symbol, a letter and a figure relating to said cut image.

14. A computer program product comprising a computer readable medium, having thereon, a computer program, which when executed by a computer, causes the computer to perform the steps of:

- dividing a said moving picture into a plurality of cut images, each cut image includes a plurality of frame images;
- generating tentative indicator images intended to correspond to representative images of said cut images;
- forming a hierarchical structure constructed by said tentative indicator images based on a program to be edited, said program being constructed by said cut images;
- displaying respective representative frame images representative of said cut images on a display;
- selecting said representative frame images to couple said representative frame images of said program with said tentative indicator images in said hierarchical structure; and
- displaying said selected representative frame images in said hierarchical structure.

15. A computer readable medium, having a computer program recorded thereon, wherein said computer program when executed by a computer, causes the computer to perform the steps of:

- dividing a moving picture into a plurality of cut images, each cut image includes a plurality of frame images;
- generating tentative indicator images intended to correspond to representative images of said cut images;
- forming a hierarchical structure constructed by said tentative indicator images based on a program to be edited, said program being constructed by said cut images;
- displaying respective representative frame images representative of said cut images on a display;
- selecting said representative frame images to couple said representative frame images of said program with said tentative indicator images in said hierarchical structure; and
- displaying said selected representative frame images in said hierarchical structure.

* * * * *